United States Patent [19]

Villarreal-Trevino et al.

[11] Patent Number: 5,110,350
[45] Date of Patent: May 5, 1992

[54] METHOD OF REDUCING IRON ORE

[75] Inventors: Juan A. Villarreal-Trevino, San Nicolás de los Garza; Eugenio Zendejas-Martinez; Enrique R. Martinez-Vera, both of Monterrey, all of Mexico

[73] Assignee: Hylsa S.A. de C.V., Monterrey, Mexico

[21] Appl. No.: 436,307

[22] Filed: Nov. 14, 1989

Related U.S. Application Data

[63] Continuation-in-part of Ser. No. 191,702, May 9, 1988, Pat. No. 4,880,458, which is a continuation-in-part of Ser. No. 54,420, May 26, 1987, abandoned, which is a continuation of Ser. No. 752,974, Jul. 8, 1985, Pat. No. 4,668,284, which is a continuation of Ser. No. 494,629, May 16, 1983, Pat. No. 4,528,030.

[51] Int. Cl.$^5$ ............................................. C21B 13/02
[52] U.S. Cl. ........................................ 75/495; 266/155
[58] Field of Search ................. 75/490, 495, 496, 498; 266/155

[56] References Cited

U.S. PATENT DOCUMENTS

| 4,528,030 | 7/1985 | Martinez-Veras et al. | 75/496 |
|---|---|---|---|
| 4,880,458 | 11/1989 | Martinez-Vera et al. | 75/35 |
| 4,880,459 | 11/1989 | Coyne, Jr. | 266/155 |

FOREIGN PATENT DOCUMENTS 1911052 10/1970 Fed. Rep. of Germany .

Primary Examiner—Melvyn J. Andrews
Attorney, Agent, or Firm—A. Thomas S. Safford

[57] ABSTRACT

A process for the gaseous reduction of iron ore to sponge in a vertical shaft, moving bed reactor wherein a hot gaseous mixture of hydrogen and carbon monoxide generated by the internal steam reformation of gaseous hydrocarbon(s), preferably methane or natural gas, is used to reduce the ore without the need for any external catalytic reformer. A reducing gas recycle loop is established to which hydrocarbon and reclaimed waste hot water are fed in the proper proportions as the reducing gas make-up source with the sponge iron produced in the reduction reactor being used to catalyze hydrocarbon reformation, and with the carbon content of the recycled gas being maintained low by removing carbon dioxide therefrom. High overall process thermal efficiency and lowered operating and capital costs are achieved by establishing hot water (and optional steam) loops wherein all process hot water/steam requirements are met through the utilization of hot water discharge from the quench cooler and advantageously also the generation of steam by the reclamation of waste heat from spent hot reducing gas leaving the reactor, thereby eliminating the need for importing costly process steam and reducing the size needed for cooling towers and water treatment units.

21 Claims, 1 Drawing Sheet

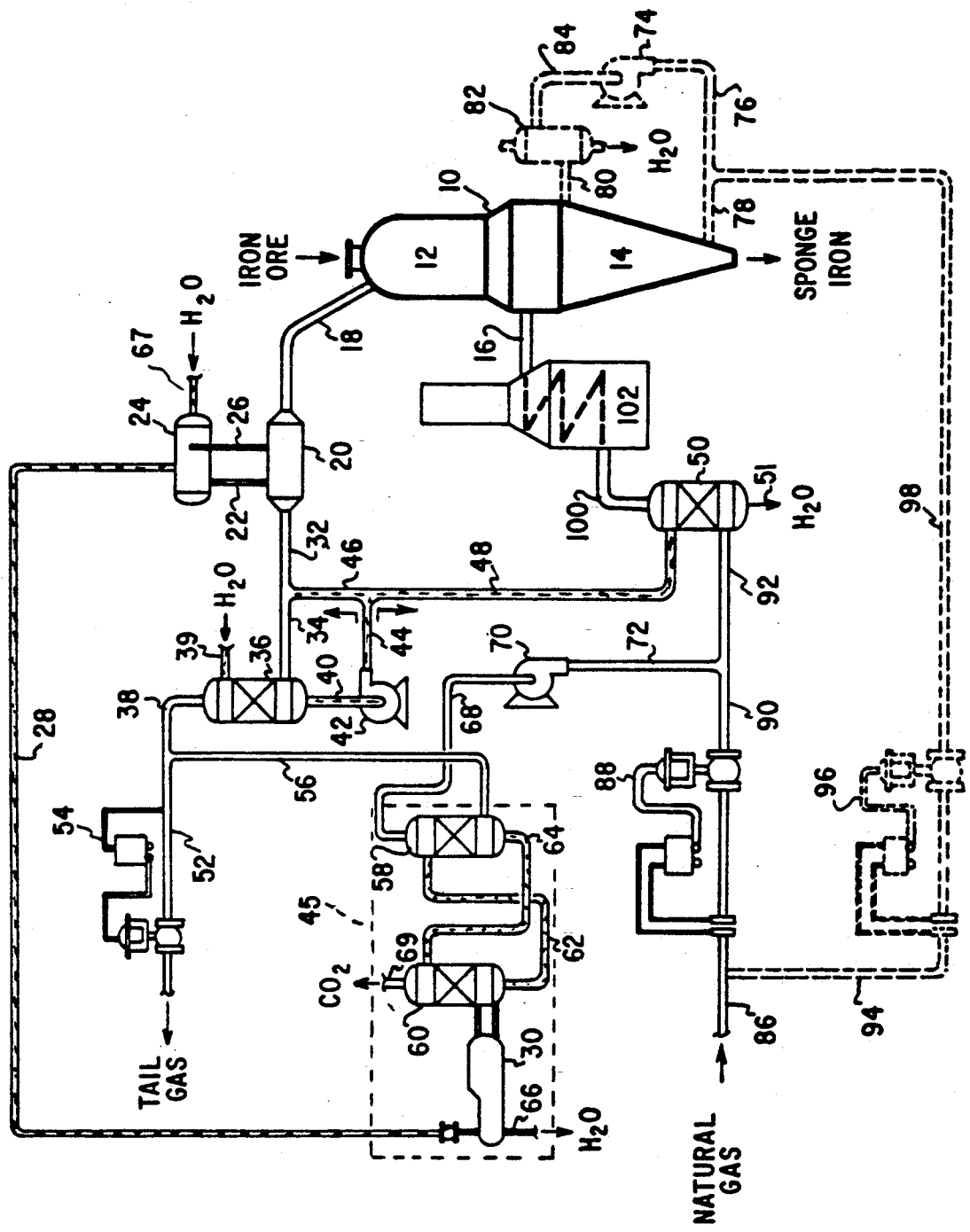

METHOD OF REDUCING IRON ORE

This application is a continuation-in-part of U.S. application Ser. No. 07/191,702, filed May 9, 1988, which issues as U.S. Pat. No. 4,880,458, on Nov. 14, 1989; which was a continuation-in-part of U.S. application Ser. No. 07/054,420, filed May 26, 1987, now abandoned; which was a continuation of U.S. application Ser. No. 06/752,974, filed July 8, 1985, issued as U.S. Pat. No. 4,668,284, on May 26, 1987; which was a continuation of U.S. application Ser. No. 06/494,629, filed May 16, 1983, issued as U.S. Pat. No. 4,528,030, on July 9, 1985 (the contents of which applications and patents are incorporated herein by reference).

FIELD OF THE INVENTION

This invention relates generally to a process for reducing particulate iron ore to sponge iron in a vertical shaft, moving bed reactor using a hot reducing gas mixture derived from natural gas. This invention is a continuation-in-part of the improvement over the foregoing process, which improvement eliminated the necessity for using an external hydrocarbon reformer, gasifier, coke oven, or other separate capital-intensive equipment as a source of reducing gas in the form of carbon monoxide and hydrogen. More particularly, the further-improved present invention relates to a unique method and apparatus for surprisingly approaching more closely the theoretical process limits of efficiency than has heretofore been possible in sponge iron production processes.

This is achieved by an improvement of the above-described iron ore reduction process, in which both the sensible and latent heat are recovered directly from the reactor gas effluent and reused in the process in the manner disclosed.

BACKGROUND OF THE INVENTION

It has long been known that the reduction of iron ore to produce iron in a form suitable for steel-making can be carried out at temperatures below the melting point of iron by passing a hot reducing gas through a bed of particulate iron ore at temperatures of the order of 700° C. to 1000° C. to produce porous particles mainly composed of metallic iron. This is often referred to in the trade and technical literature as sponge iron or as direct reduced iron (DRI for short).

Because of its wide availability, natural gas has been extensively used as a source of the reducing gas for such iron sponge processes. This hydrocarbon gas is typically largely all methane. However, since methane per se is a relatively ineffective reducing agent for iron ore, it has been necessary to reform the methane by reaction with water or with carbon dioxide into a mixture of carbon monoxide and hydrogen for use as an ore-reducing gas. [See for example U.S. Pat. Nos. 3,765,872; 4,150,972, and 4,046,557, which all teach the use of a separate catalytic reformer external to the reduction reactor (some reformers being in, and others being out of, the reducing gas recycle loop)]

While reduction systems using reformed natural gas as a reducing agent have been extensively used commercially, they are open to the serious objection that the catalytic reformers they employ are costly pieces of equipment and form a substantial part of the investment and up-keep in such a sponge iron producing plant. Early attempts to eliminate external reformers were still tied to capital intensive accessory capital equipment; such as the coke ovens needed in U.S. Pat. No. 4,253,867, issued Mar. 3, 1981.

A process capable, or producing high quality sponge iron without using an external catalytic reformer or the like would substantially reduce the capital cost of such a plant. Such a system has been disclosed in the above-mentioned U.S. Pat. Nos. 4,668,284 and 4,528,030 (the subject matter of which is continued in this case) See also U.S. Pat. No. 4,880,458.

In the process disclosed in such patents, the natural gas is converted into hydrogen and carbon monoxide inside the reduction reactor using freshly reduced sponge iron as the catalyst. Water is injected into the reduction reactor (even though water is an oxidant) so as to promote the steam reformation of natural gas and to control carburization.

U.S. Pat. No. 4,432,789 granted to Mathisson et al., on Feb. 21, 1984, describes one method for minimizing some of the energy consumption in a reduction process to produce sponge iron. For this purpose, Mathisson proposes to recover the sensible heat (only) from the gas stream effluent from the reduction reactor to produce steam and utilize said steam for regenerating the washing liquid in the $CO_2$ absorption system.

This concept had earlier been anticipated by Segre in U.S. Pat. No. 2,807,535 and by Koenig in German Laid-open application OS 1,911,052, published on Oct. 1, 1970.

However, the prior art fails to disclose any recuperation of the sensible and the latent heat present in the hot gas effluent from the reactor with such heat value being incorporated as hot water added back into the reducing gas recycled to the reactor. It also does not teach recovery of the hot water condensed from such hot gas effluent for such purpose. Even more specifically it does not collect and directly re-use the already hot and dirty quench water and condensed effluent water, supplying such hot water per se to humidify the gas stream fed to the reactor.

SUMMARY OF THE INVENTION

It is accordingly an object of the present invention to provide a sponge iron production process of the foregoing type in which no external catalytic reformer and no external source of process steam is required. It is another object of the invention to provide such a process wherein the energy utilization is dramatically improved. A further object of the invention is to provide a method and apparatus to increase the energy efficiency in a reduction process of the above mentioned type wherein heat of the effluent gas from the reactor is recovered to produce hot water to humidify the natural gas and reducing gas eliminating the need of an external source of process steam and significantly reducing the need for water purification treatment and for cooling towers, and optionally to integrate the foregoing with diverting sufficient heated water in the form of steam thus produced for use in the regeneration in the $CO_2$ absorption system. Other objects of the invention will be in part obvious and in par pointed out hereafter.

The present invention can be usefully incorporated in at continuous reaction system of the general type referred to above wherein a hot reducing gas flows upwardly through a descending bed of particulate ore, in the reduction zone of a reactor, spent gas is removed near the top of the reduction zone and upgraded by removal of the $CO_2$ and $H_2O$ reduction by-products, and the upgraded gas is proportionally humidified with respect to added make-up natural gas, heated and returned to the bottom of the reduction zone to form a reducing gas loop. The objects and advantages of the invention are achieved in general by heating water by direct contact with the hot gas effluent from the reactor as well as by extracting the hot water content thereof (to recover not only sensible heat, but also latent heat) and then humidifying the upgraded reducing gas and make-up natural gas with said hot water, in an amount sufficient to have water and methane preferably in a molar ratio of 1.4:1 to 2.2:1. By adjusting the ratio of water to methane in the make-up gas, reformation of methane inside the reactor is carried out and the carbon content of the sponge iron produced is effectively selectively varied over a useful range (typically from 1% to 4% carbon, if used with a cooling loop; and from 1% to 2%, if used with hot DRI discharge) with a metalization preferably of 90% to 94%.

The foregoing is preferably accomplished by recovering hot water discharged from a quench cooler, and then using such hot water for humidifying the upgraded reducing gas in an amount sufficient to cause the endothermic steam reformation etc. of added natural gas, while surprisingly being able to control within desired limits the carburization of the hot sponge iron product, all inside the reduction zone of the reactor, and all without the need of any external source of process steam for any of the overall process. Advantageously also a steam generating heat exchanger is used to recover some of the sensible heat from the reactor. There is an estimated saving of 0.2 to 0.3 gigacalories per ton of iron in the amount of natural gas used in the process of the present invention as compared to the same type of process not having such off-gas heat and water recuperation (i.e., as compared between the present invention and U.S. Pat. No. 4,668,284). As disclosed in the latter patent, any hydrocarbon which is gaseous at reforming temperatures can be used in this type of reformerless DRI process in place of or in addition to the preferred natural gas makeup.

BRIEF DESCRIPTION OF THE DRAWING

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

The single drawing illustrates diagrammatically an apparatus capable of carrying out a preferred embodiment of the present invention.

DESCRIPTION OF A PREFERRED EMBODIMENT

The objects and advantages of the present invention can best be understood and appreciated by reference to the accompanying drawing which illustrates diagrammatically an apparatus capable of carrying out a preferred embodiment of the invention. Referring to the drawing, the numeral 10 designates a conventional vertical shaft, moving bed, iron ore gaseous reduction reactor having a reduction zone 12 in the upper part thereof and a discharge zone 14 in the lower part thereof. This preferably operates at a pressure range of 3 to 4 atmospheres. Iron ore is fed to the top of zone 12 and reduced hot sponge iron is removed at the bottom of zone 14. The reduction zone 12 of reactor 10 forms part of a reducing gas loop. Hot reducing gas preferably in the range of 900° C.-1000° C. largely composed of hydrogen and carbon monoxide flows through a pipe 16 into the bottom of the zone 12 and thence upwardly through the body of particulate ore therein to reduce the descending ore to sponge iron. Spent gas at a temperature ranging from 300° C.-450° C., e.g., at 370°C., leaves the reactor through a pipe 18 and advantageously is cooled in a heat exchanger 20 down to about 170° C.-200° C., e.g., at 170° C. The spent gas is cooled in the heat exchanger by $H_2O$ coming from dome 24 through pipe 22 and returns to dome 24 in the form of steam through pipe 26. Steam generated in the heat exchanger 20 flows through pipe 28 to reboiler 30. From heat exchanger 20 the spent gas flows through pipes 32 and 34 and is further cooled and de-watered in a quench cooler 36 having a gas outlet pipe 38. Water injected by pipe 39 (advantageously at least partially recycled from pipes 66 and/or 51) flows through the quench cooler 36 to exchange heat with the already partially cooled spent gas, is collected together with the condensed recycle and effluent waters, is introduced with the other condensed water through pipe 40 to the suction side of pump 42 and is thence pumped through pipe 44. The pipes carrying only water or steam are illustrated with a central dashed line and those pipes in the $CO_2$ absorber 45 for carrying only aqueous alkanolamine or the like are illustrated with a central dotted line to differentiate from the main process pipes carrying recycle and other gases. The hot water flowing through pipe 44 is divided. One portion thereof is recycled through pipe 46 and injected through a quench orifice (not shown) into pipe 34 to saturate with the partially cooled, but relatively hotter, spent gas flowing from pipe 32. The latent heat of the injected water further cools the effluent gas, and the resulting gaseous mixture flows through pipe 34 to the quench cooler 36, where the cooling is completed and the steam present in the effluent gas is condensed out. The remainder portion of the water from pipe 44 is pumped through pipe 48 to humidifier 50.

The cooled and de-watered spent gas flowing through pipe 38 is divided. One relatively small portion is removed from the system through pipe 52 containing back pressure regulator 54, and the remainder is recycled on ultimately to the reduction zone 12.

Pipe 52 with regulator 54 functions as a process system pressure control and also prevents buildup of unwanted gases, such as $N_2$ or He (sometimes introduced as part of the natural gas make up). This vented gas still has caloric value and can be used in the burners of the heater 102.

The recycled portion of the spent gas flows through pipe 56 into the $CO_2$ absorber 45, and more particularly to the bottom of absorber column 58 and thence upwardly through the absorber 58 in counter-current contact with a cooled aqueous alkanolamine or other alkaline solution wherein $CO_2$ is removed from the spent gas to reduce the carbon content thereof. An absorber of this type advantageously used for this process is described in assignee's U.S. Pat. No. 4,714,597, issued Dec. 22, 1987 the contents of which are incorporated by reference.

Hot $CO_2$ lean amine solution from the bottom of stripper column 60 flows through pipe 62 to the top of absorber column 58. The amine moves downwardly through the absorber counter-current to the spent gas, and absorbs $CO_2$ and certain other acid gas constituents, which may be present from the dewatered effluent gas stream (i.e. spent gas). The $CO_2$-rich amine solution exits the bottom of absorber column 58 and flows through pipe 64 to the top of stripper column 60. The steam entering heat exchanger 30 via pipe 28 interchanges heat with the rich amine solution from stripper column 60 and strips the acid gases from the rich solution. The condensed water leaves heat exchanger 30 through pipe 66. This water from pipe 66 preferably is evaporatively cooled and then is recycled, with added pre-treated make-up water as needed, via pipe 67 to dome 24. This could also be recycled to pipe 39, but the latter does not need such high quality water. Although the process now produces an excess of water (by recovering the water from the reduction reaction), the cooling towers use enough water normally to require some make up water to pipe 39.

The acid gases, mainly $CO_2$, leave the top of stripper column 60 via pipe 69. The upgraded spent gas substantially free of $CO_2$ exits absorber via pipe 68 and is pumped by pump 70 through pipe 72.

Optionally, discharge zone 14 can be modified to be a cooling zone 14 of reactor 10 and used also as a part of a separate cooling gas recycle loop. The cooling zone process equipment is shown in dashed lines to demonstrate visually the optional nature of the cooling zone. In this modification cooling gas is pumped by a pump 74 through pipes 76 and 78 to the bottom of cooling zone 14 and flows upwardly through the descending body of particulate sponge iron to cool it. The recycled gas, withdrawn from the top of cooling zone 14 through a pipe 80, is cooled in a cooler 82 and returned through pipe 84 to the suction side of pump 74.

Preferably, the zone 14 is not a cooling zone but feeds directly to a hot briquetting machine. It is a surprising aspect of this invention that a hot discharge is possible with good control of the carburization, since the amount of water added to the natural gas can also be varied to aid in controlling the degree of carburization without upsetting the effective internal reformation of natural gas. Carbon in DRI is increased by decreasing the amount of water present inside the reactor. This can be accomplished for example, by increasing the flow rate of water introduced to the quench cooler 36, via pipe 39.

Introducing more water to cooler 36 lowers the temperature of water flowing through pipe 48 to humidifier 50, and consequently, the gas, flowing through pipe 100 saturated at a lower temperature, carries less water to the reactor.

To decrease the carbon content in DRI, the amount of water introduced to cooler 36 is decreased, or less steam is produced at heat exchanger 20, leaving the gas through pipes 32 and 48 at a higher temperature. This will produce a saturated gas in pipe 100 at a higher temperature, and consequently with more water in the reactor.

The advantages and background concerning the hot discharge reactor and the carbon control thereof is documented in U.S. Pat. No. 4,834,792, issued on May 30, 1989 and U.S. Pat. No. 4,734,128, issued on Mar. 29, 1989 (the contents of which are also incorporated by reference).

Natural gas from a suitable source enters the system through a pipe 86 containing a flow controller 88. At least a portion of the entering natural gas flows through pipe 90 and into the reducing gas loop via pipe 92. Optionally a portion of the natural gas from pipe 86 can be divided out to flow through pipe 94 containing flow controller 96 and thence through pipe 98 to the optional cooling loop. As shown in assignee's U.S. Pat. No. 4,556,417 issued Dec. 3, 1985, when this is done, there can be some upflow from the cooling zone into the reduction zone to enhance cooling (though with the present process no other measurable advantage resulted). Other sources or types of cooling gas other than natural gas can also be used (e.g. reducing gas, inert gas, etc.).

The entering natural gas flowing to the reducing gas recycle loop is mixed with the upgraded spent gas from the absorber 58, and the mixture flows thorough pipe 92 to humidifier 50 wherein it is mixed with the relatively hot water flowing in through pipe 48 in a controlled ratio relative to the makeup natural gas from pipe 90. It appears that when methane and steam are added to the recycled gas in the proper proportions, the desired reformation of the methane to produce hydrogen and carbon monoxide for ore reduction is catalyzed by the product sponge iron within the reactor. The humidifier 50 can be of the standard commercial type with water flow over palls, trays, or the like with high surface area and convoluted flow patterns. Preferably, all of the collected cooling water from pipe 48 is fed to the humidifier 50 and any purging needed of such water is thereafter from pipe 51. Such purged water from pipe 51 has the solids settled out, is cooled, and preferably recycled to pipe 39 (not to pipe 67, which latter requires higher quality water).

From the humidifier, the upgraded spent gas with make up added water and natural gas flows through pipe 100 to a heater 102 wherein it is heated to a suitable temperature e.g. 950° C. and thence through pipe 16 to the reduction zone. While water from pipe 48 or steam from pipe 28 could instead be injected through a venturi or expansion valve at pipe 16 rather than in the more elaborate humidifier 50, as a practical matter a more even and complete humidification is achieved with the water. Also, injectors and valving on the hot side of the heater 16 are preferably to be avoided. Thus the make-up natural gas and the recycle gas are advantageously mixed with each other and with water before they are heated and fed to the reactor. The use of the humidifier 50 after such mixing and before the heater is preferred in order to achieve saturation in a manner to give the most total water content (to achieve the 11% preferred water content in the gas fed to the reducing zone of the reactor so as to support adequately the reformation reaction in the reactor).

SPECIFIC EXAMPLE

A typical run at the pilot plant having a capacity of about 24 tons/day, produced the following data. With reference to the drawing, reducing gas was fed to the reduction zone 12 through pipe 16 at about 950° C., the gas flows through the iron ore bed of about 16 tons, which is reduced to sponge iron with about 92% metallization, and exits the reactor through pipe 18 at about 433° C. with about 1.7% carburization. This hot effluent gas passes through heat exchanger 20 where steam is produced, and then flows through pipe 32 at about 180° C. Water at about 88° C. is injected via pipe 46 through a quench orifice into the end of pipe 32, bringing down the temperature of said gas to around 103° C. in pipe 34. The gas is then fed to quench cooler 36 where water from pipe 39 at about 32° C. is put in direct contact with the gas, cooling the gas down to about 38° C. This condenses water present in effluent gas, thus imparting the latent heat to the quench water. The collected water which then flows through pipe 40 is at about 88° C. and is pumped by pump 42 through pipe 44 and on to both the quench orifice and the humidifier 50.

After passing through the $CO_2$ absorber 45, the reducing gas is recycled on toward the reduction zone 12 through pipes 68 and 72. Make-up natural gas is fed to the system through pipe 90, is combined with the recycled reducing gas from pipe 72 (which is heated somewhat by the action of the compressor 70) and the combined gas stream at about 88° C. flows through pipe 92 to the humidifier 50. The reducing gas exits the humidifier at about 74° C. and is saturated with about 11% water content. This amount of evaporated water mixed with the recycle gas and natural gas is then fed to the reduction zone 12 after the gas mixture has been heated in gas heater 102 to the aforementioned 950° C. The total amount of energy recovered by the direct utilization of the quench water (that would otherwise have been dissipated to the environment and lost) is increased significantly by taking advantage of the latent heat.

From the foregoing description it will be apparent that iron ore reduction systems embodying the present invention are capable of achieving the several objectives set forth at the beginning of the specification. Effective and significantly more efficient reduction of the ore to produce sponge iron is obtained without the use of a separate catalytic reformer and without any external source of steam for reformation of methane inside the reactor or for running the $CO_2$ absorption system. Moreover, the recycling of the hot quench water to the reactor avoids the necessity of an external steam generating unit and its related water treatment unit, while permitting lower capacity cooling systems. Because of the recycling of water (e.g. via pipe 46) less cooling water is needed for pipe 39. The present invention, by recuperating sensible and latent heat from the gas effluent from the reactor, reduces the make-up water needs in cooling towers to the range of 0.3 to 0.4 M3 / Fe Ton.

We claim:

1. A method for the gaseous reduction of particulate iron ore to sponge iron, comprising:
    providing a vertical shaft moving bed reactor having at least a reduction zone;
    feeding to said reduction zone a hot stream of reducing gas largely composed of hydrogen, carbon monoxide, and including hydrocarbon(s) and water;
    causing said hot reducing gas stream to flow through at least a portion of said bed to reduce the ore in said reactor to sponge iron while also giving water and $CO_2$ as reduction reaction products and yet also to produce $H_2$ and CO from at least said hydrocarbon(s), and resulting in a partially spent reducing gas as a hot off-gas stream;
    withdrawing said off-gas stream from said reactor and causing at least a major portion of such off-gas stream to circulate at least a major portion of such off-gas stream to circulate in a recycle loop returning to said reduction zone, which recycle loop comprises said reduction zone, a cooler/dewaterer & a $CO_2$ absorber, and a humidifier & a heater;
    cooling said off-gas stream circulating in said recycle loop sufficiently to condense the water present as water vapor in said hot off-gas stream and removing from said recycle loop at least condensed water to form a hot liquid-water stream thereby dewatering and removing both the latent heat of the condensed watering addition to the sensible heat from such off-gas stream;
    also removing $CO_2$ from such off-gas stream to give an upgraded reducing gas stream in said recycle loop;
    feeding to said upgraded reducing gas stream in said recycle loop added hydrocarbon(s) and added water in at least one stream which serve as make-up source(s) for the reducing gas;
    heating at least the upgraded reducing gas stream in said recycle loop and feeding such upgraded reducing gas stream mixed with said added hydrocarbon(s) and said added water to said reduction zone via said recycle loop as said hot reducing gas stream;
    said added water being fed hot in liquid or vapor form into the upgraded reducing gas stream, most of the elevated temperature of such added water being derived from both the sensible heat of the hot off-gas stream and the latent heat of the water condensed from the off-gas stream; and
    the $H_2$ and CO present in said reactor and said recycle loop being generated therein essentially from said hydrocarbon(s) catalyzed by the sponge iron internally within the reactor without using any external catalytic reformer.

2. A method according to claim 1, further comprising maintaining a molar ratio of $H_2O$ to hydrocarbon carbon-atoms fed to the upgraded gas stream in said recycle loop in the range of 1.4:1 to 2.2:1; and regulating the carbon content of said sponge iron between about 1% and up to about 4% produced by inversely adjusting the water content of the upgraded gas stream fed to said reduction zone relative to the carbon content of the hydrocarbon therein.

3. A method for the gaseous reduction of particulate iron ore to sponge iron, comprising:
    providing a vertical shaft moving bed reactor having at least a reduction zone;
    feeding to said reduction zone a hot stream of reducing gas largely composed of hydrogen, carbon monoxide, and including hydrocarbon(s) and water;
    causing said hot reducing gas stream to flow through at least a portion of said bed to reduce the ore in said reactor to sponge iron with water and $CO_2$ as byproducts of the reduction reaction, resulting in a partially spent reducing gas as a hot off-gas stream;
    withdrawing said off-gas stream from said reactor and causing at least a major portion of such off-gas stream to circulate in a recycle loop returning to said reduction zone, which recycle loop comprises said reduction zone, a heat extractor, and a $CO_2$-modifier, heater and humidifier;
    containing said off-gas stream in said recycle loop with a stream of liquid water in heat-exchange relationship, so that said liquid water extracts heat and water from said hot off-gas stream to give an improved reducing gas stream in said recycle loop;

feeding to said improved reducing gas stream in said recycle loop added hydrocarbon(s) and added water in at least one stream which serve as make-up source(s) for the reducing gas, most of the elevated temperature of such added water being derived from both said hot off-gas stream; also modifying to substantially eliminate $CO_2$ from the improved reducing gas stream in said recycle loop, and heating the improved reducing gas stream in said recycle loop; and feeding the resulting hot upgraded gas stream mixed with said added hydrocarbon(s) and said added water to said reduction zone as said hot reducing gas stream.

4. A method for the gaseous reduction of particulate iron ore to sponge iron, comprising:

providing a vertical shaft moving bed reactor having at least a reduction zone;

feeding to said reduction zone a hot stream of reducing gas largely composed of hydrogen, carbon monoxide, and including hydrocarbon(s) and water;

causing said hot reducing gas stream to flow through at least a portion of said bed to reduce the ore in said reactor to sponge iron while also giving $H_2O$ and $CO_2$ reduction reaction products and yet also to produce $H_2$ and $CO$ from at least said hydrocarbon(s), and resulting in a partially spent reducing gas as a hot off-gas stream;

withdrawing said off-gas stream from said reactor and causing at least a major portion of such off-gas stream to circulate in a recycle loop returning to said reduction zone, which recycle loop comprises said reduction zone, a cooler/dewaterer & a $CO_2$ absorber, and a humidifier & a heater;

cooling said off-gas stream sufficiently to condense the water present as water vapor in said hot off-gas stream and removing from said recycle loop at least condensed water as a hot liquid-water stream;

also removing $CO_2$ from such off-gas stream to give an upgraded reducing gas stream in said recycle loop;

feeding to said upgraded reducing gas stream in said recycle loop added hydrocarbon(s) and added water in at least one stream which serve as make-up source(s) for the reducing gas;

heating at least the upgraded reducing gas stream in said recycle loop and feeding such upgraded reducing gas stream mixed with said added hydrocarbon(s) and said added water above about 700° C. to said reduction zone via said recycle loop as said hot reducing gas stream; and supplying at least a first portion of the hot liquid-water stream as said added water to said upgraded reducing gas stream.

5. A method according to claim 4, wherein said cooling is by direct contact of said off-gas stream with quench water, and said hot liquid-water stream containing heat extracted from said hot off-gas further includes the quench water which was heated by cooling the off-gas stream in addition to said condensed water.

6. A method according to claim 5, further comprising humidifying to saturation said upgraded reducing gas stream by contact with said hot liquid-water stream and thereafter heating said humidified upgraded reducing gas stream.

7. A method according to claim 5, further comprising feeding said off-gas stream to heat exchanger to produce steam, said $CO_2$ removal step utilizing a $CO_2$ absorber that incorporates a reboiler, supplying steam from said heat exchanger to said reboiler.

8. A method according to claim 6, further comprising feeding said off-gas stream to heat exchanger to produce steam, said $CO_2$ removal step utilizing a $CO_2$ absorber that incorporates a reboiler, supplying steam from said heat exchanger to said reboiler.

9. A method according to claim 5, further comprising injecting a second portion of the hot liquid-water stream into said off-gas stream to saturate the off-gas stream prior to a final quench cooling.

10. A method according to claim 8, further comprising injecting a second portion of the hot liquid-water stream into said off-gas stream after said heat exchanger to saturate the off-gas stream prior to a final quench cooling.

11. A method according to claim 6, further comprising humidifying said upgraded reducing gas stream to on the order of 11% prior to heating and regulating the carbon content of said sponge iron between about 1% and up to about 4% produced by inversely adjusting the water content of the upgraded reducing gas stream fed to said reduction zone relative to the carbon content of the hydrocarbon therein.

12. A method according to claim 11, further comprising controlling the humidity of said saturated upgraded reducing gas stream prior to heating by controlling the degree of cooling of the off-gas stream by adjusting the temperature and/or the flow rate of cooling water in the quench cooling step.

13. A method according to claim 5, further comprising maintaining a molar ratio of $H_2O$ to hydrocarbon carbon-atoms fed to the upgraded reducing gas stream in said recycle loop in the range of 1.4:1 to 2.2:1.

14. A method according to claim 5, further comprising said make-up source(s) consisting essentially of hot liquid water from said liquid-water stream and of hydrocarbon which is gaseous at reducing temperatures.

15. A method according to claim 14, wherein said added make-up hydrocarbon is natural gas.

16. A method according to claim 14, wherein said hydrocarbon is at least mainly methane.

17. A method according to claim 14, wherein the reactor has a cooling zone is the lower portion thereof and further 18. A method according to claim 15, wherein the make-up water and hydrocarbon are both fed as at least one stream to said recycle loop beyond the points of dewatering and of removal of carbon dioxide and before the point at which the upgraded reducing gas stream is re-heated.

19. A method according to claim 18, wherein the added water and hydrocarbon are fed in separate streams to said recycle loop.

20. A method according to claim 5, wherein the temperature of said upgraded reducing gas stream fed to such reduction zone is maintained between 700° C. and 1000° C.

21. A method according to claim 10, further comprising:

maintaining the temperature of said upgraded reducing gas stream fed to such reduction zone at between 900° C. and 1000° C.;

maintaining a molar ratio of $H_2O$ to hydrocarbon carbon-atoms fed to the upgraded reducing gas stream in said recycle loop in the range of 1.4:1 to 2.2:1; and said make-up source(s) consisting essentially of hot liquid water from said condensed liquid-water stream and of natural gas as the added make-up hydrocarbon.

* * * * *

UNITED STATES PATENT AND TRADEMARK OFFICE
CERTIFICATE OF CORRECTION

PATENT NO. : 5,110,350                           Page 1 of 2
DATED      : May 5, 1992
INVENTOR(S): Juan Antonio Villarreal-Trevino et al.

It is certified that error appears in the above-indentified patent and that said Letters Patent is hereby corrected as shown below:

In the Claims:
　　Claim 1, Col. 7, lines 67-68, delete at least a major portion of such off-gas stream to circulate--;
　　Claim 1, Col. 8, line 10, delete "watering" and add --water in--;
　　Claim 3, Col. 8, line 64, delete "containing" and add --contacting--;
　　Claim 3, Col. 9, line 6, delete --both--;
　　Claim 4, Col. 9, line 28, after bon(s), delete --and--;
　　Claim 4, Col. 9, lines 48-49, replace "hydrocabon(s) by --hydrocarbon--;

UNITED STATES PATENT AND TRADEMARK OFFICE
CERTIFICATE OF CORRECTION

PATENT NO. : 5,110,350
DATED : May 5, 1992
INVENTOR(S) : Juan Antonio Villarreal-Trevino et al.

It is certified that error appears in the above-indentified patent and that said Letters Patent is hereby corrected as shown below:

Claim 7, Col. 9, line 67, after "to" and before "heat" insert --a--;

Claim 8, Col. 10, line 4, after "to" and before "heat" insert --a--;

Claim 17, Col. 10, line 42, replace "is" by --in--; and

Claim 17, Col. 10, line 43, after "further" insert --comprising cooling said sponge iron by circulating cooling gas in a recycle loop including said cooling zone, whereby sponge iron produced in said reactor is discharged cool--.

Signed and Sealed this

Twenty-seventh Day of September, 1994

BRUCE LEHMAN

Attest:

Attesting Officer

Commissioner of Patents and Trademarks